United States Patent
Joseph et al.

(10) Patent No.: US 10,992,822 B2
(45) Date of Patent: Apr. 27, 2021

(54) APPARATUS FOR ADJUSTING CONTROL PARAMETERS OF A PRINTING SUBSTANCE FOR A PRINTING SYSTEM

(71) Applicant: HP INDIGO B.V., Amstelveen (NL)

(72) Inventors: Lior Joseph, Ness Ziona (IL); Yoav Landau, Ness Ziona (IL); Noam Parvin, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/628,802

(22) PCT Filed: Jul. 12, 2017

(86) PCT No.: PCT/EP2017/067594
§ 371 (c)(1),
(2) Date: Jan. 6, 2020

(87) PCT Pub. No.: WO2019/011428
PCT Pub. Date: Jan. 17, 2019

(65) Prior Publication Data
US 2020/0204686 A1 Jun. 25, 2020

(51) Int. Cl.
| H04N 1/60 | (2006.01) |
| H04N 1/00 | (2006.01) |
| G03G 15/01 | (2006.01) |
| G03G 15/10 | (2006.01) |
| G03G 15/00 | (2006.01) |

(52) U.S. Cl.
CPC ..... *H04N 1/00023* (2013.01); *G03G 15/0121* (2013.01); *G03G 15/105* (2013.01); *G03G 15/55* (2013.01); *H04N 1/00087* (2013.01); *G03G 2215/0658* (2013.01)

(58) Field of Classification Search
None
See application file for complete search history.

(56) References Cited

U.S. PATENT DOCUMENTS

| 6,263,171 | B1 | 7/2001 | Oyamada |
| 7,835,043 | B2 | 11/2010 | Gila et al. |
| 8,564,861 | B2 | 10/2013 | Henderson |
| 8,922,777 | B2 * | 12/2014 | Shemer ............ G01N 21/5907 356/434 |
| 8,922,838 | B2 * | 12/2014 | Fernandez del Rio ............ B41J 2/2114 358/3.27 |
| 8,936,896 | B2 | 1/2015 | Bar-Haim et al. |
| 9,020,371 | B2 | 4/2015 | Amit et al. |

(Continued)

FOREIGN PATENT DOCUMENTS

EP 1386743 B1 2/2004

OTHER PUBLICATIONS

Sardjeva, Rossitza et al. "Digital Electrophotography With Improved Printed Color Quality." International Journal of Electronics and Communication Engineering 2, No. 4 (Sep. 2013): 167-74.

(Continued)

*Primary Examiner* — Dung D Tran
(74) *Attorney, Agent, or Firm* — Fabian VanCott

(57) ABSTRACT

Example aspects described herein relate to an apparatus for adjusting control parameters of a printing substance for a printing system. Such adjustments may occur in conjunction with a color calibration process of the printing system.

20 Claims, 5 Drawing Sheets

(56) References Cited

U.S. PATENT DOCUMENTS

| | | | |
|---|---|---|---|
| 2002/0114637 A1 | 8/2002 | Park et al. | |
| 2011/0102003 A1* | 5/2011 | Bhattacharyya | G03G 15/105 |
| | | | 324/699 |
| 2013/0330092 A1 | 12/2013 | Amit et al. | |
| 2015/0071665 A1* | 3/2015 | Lam | G01N 27/02 |
| | | | 399/60 |

OTHER PUBLICATIONS

Security Printing Deterrents: HP Pagewide Technology, (2006) Accessed May 26, 2017. < https://www.kautbullinger.de/buero-systemhaus/engineering/hp-pagewide-xl/datenblaetter/kautbullinger-hp-pagewide-xl-technologie-white-paper.pdf >.

* cited by examiner

APPARATUS FOR ADJUSTING CONTROL PARAMETERS OF A PRINTING SUBSTANCE FOR A PRINTING SYSTEM

BACKGROUND

Color calibration is a process in which the color response of a device is measured and adjusted to a known state. In printing systems, such calibration may involve comparing a test print result using a photometer with an original reference file or reaching a predefined color target value (e.g., optical density). Calibration is usually performed for each printing system, printing target and printing substance combination.

BRIEF DESCRIPTION OF THE DRAWINGS

The foregoing will be apparent from the following more particular description of the examples provided herein, as illustrated in the accompanying drawings in which like reference characters refer to the same parts throughout the different views. The drawings are not necessarily to scale, emphasis instead being placed upon illustrating the examples provided herein.

DETAILED DESCRIPTION

In the following description, for the purposes of explanation and not limitation, specific details are set forth, such as particular components, elements, techniques, etc. in order to provide a thorough understanding of the examples provided herein. However, the examples may be practiced in other manners that depart from these specific details. In other instances, detailed descriptions of well-known methods and elements are omitted so as not to obscure the description of the examples provided herein.

Color calibration is a process in which the color response of a device is measured and adjusted to a known state/predefined color target value. In printing systems, such calibration may involve comparing a test print result using a measurement via a photometer with an original reference file. Calibration is usually performed for each printing system, printing target and printing substance combination. Herein printing substance shall be interpreted as any printing substance capable of transferring color to a printing target, for example, a printing solution or a printing power or particle based substance.

Color calibration may be performed at specific moments of time where an inline device, such as a photometer, is used to monitor the color (e.g., optical density) of a resulting color on a printing target. Such optical density measurements may be performed on test print patches on the printing target. Once the optical density deviates a certain amount from a set point, color calibration may commence.

Other forms of calibration in a printing system include the calibration of various control parameters of the printing substance. Typically, the control parameters are continuously monitored and controlled/adjusted to a predefined value of the controlled parameter.

Example aspects presented herein relate to an apparatus for adjusting control parameters of a printing substance for a printing system prior to a color calibration process. The adjustment of the control parameters are provided in order to adjust control parameters of the printing substance such that a value of the control parameters of the printing substance fall within an acceptable deviation of an operational set point associated with the printing substance.

Typically, such control parameter calibrations are not performed immediately before a color calibration process. The apparatus as described herein provides for a means of adjustment where the control parameters are adjusted to the operational set points thereby providing a more efficient and effective color calibration process.

Figure 1:
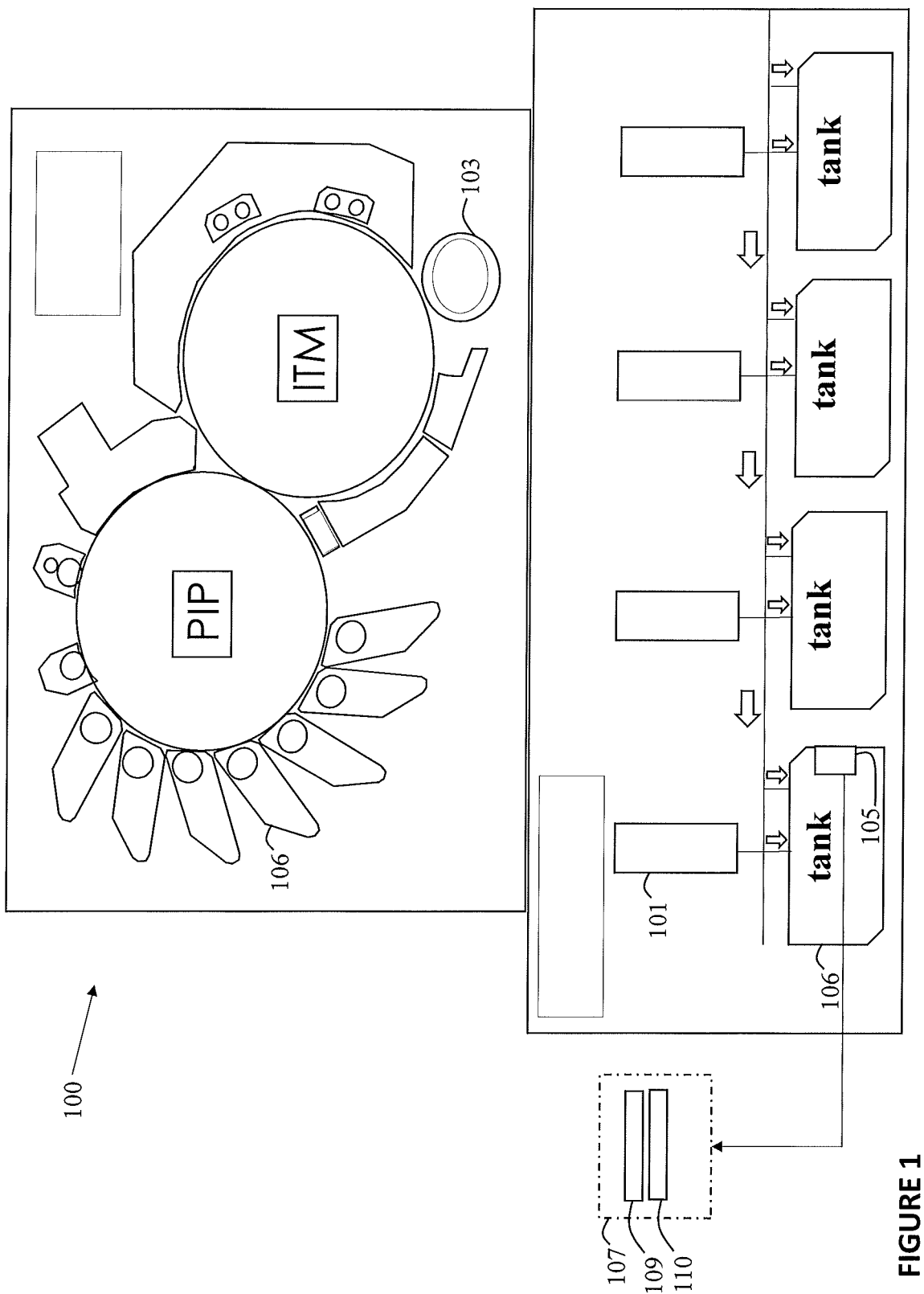
FIG. 1 is an illustrative example of a printing system which may utilize the example aspects described herein.

FIG. 1 illustrates an example printing system 100 which may utilize the example aspects described herein. The printing system 100 illustrated in FIG. 1 is a Liquid Electrophotography (LEP) printing system. The LEP printing system is provided merely as an example. Other forms of printing systems may utilize the example aspects described herein.

The printing system 100 may comprise any number of printing substance tanks 106. The tanks 106 may be configured to deposit a printing substance on a first drum, which in the example provided in FIG. 1 is an electrostatic (PIP) drum. The use of a drum is merely an example, the example aspects presented herein may be utilized with other forms of transfer members, for example, belts and other configurations.

Thus, in the example provided in FIG. 1, the printing substance may be an electrically charged printing solution. Thus, the PIP drum may comprise an electrostatic charge in a pattern intended to be printed on the printing target. Thereafter, the printing substance may be transferred from the PIP drum to a second drum, which in the example provided in FIG. 1 is an intermediate transfer (ITM) drum. From the ITM drum, the printing substance may thereafter be transferred to a printing target 103.

According to some example aspects, the printing tank 106 may comprise any number of sensors 105 which may be used to measure a value of any number of printing control parameters. The measured values 109 may thereafter be compared 107 with associated predetermined threshold range of the control parameter 110. The predetermined threshold range is associated with an operational set point which associated with the printing substance. If the measured control parameter is outside of the predetermined threshold range, the control parameter may be adjusted. Adjustments may be made with the use of capsule 101.

Figure 2:
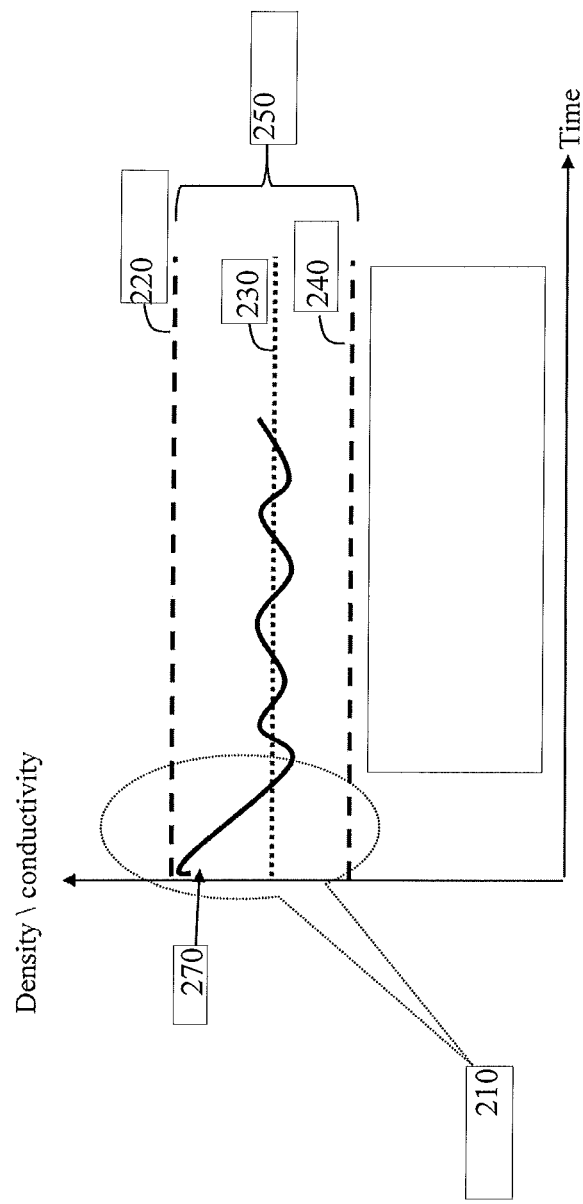
FIG. 2 is an illustrative example of control parameter adjustment during a color calibration process, according to some of the example aspects described herein.

FIG. 2 provides a graphical representation of the color calibration process and control parameter adjustment. Dashed lines 220 and 240 represent an operational working window in which the control parameters may operate. The predetermined threshold range of values of the control parameters which will yield the intended optical density are within this operational working window 250. The predetermined threshold range will be different for different printing substances. The set operational point is illustrated as dashed line 230. During the color calibration process, the control parameters are adjusted such that the values may fall as close as possible to the set operational point 230.

Point 270 represents the start of the color calibration process according to current methods. As is illustrated, during the start of the color calibration process, measurements of the resulting optical density are obtained via a sensor reading on the printing target. Thereafter, adjustments to the control parameters may be made. As shown in FIG. 2, a period of time 210 may pass before the control parameter values are adjusted close to the set operational point 230. In the aspects described above, the period of time 210 is eliminated as the adjustments are provided prior to the color calibration process. Thus, the control parameters are adjusted to within the operational set point at the start of the color calibration process.

Figure 3:
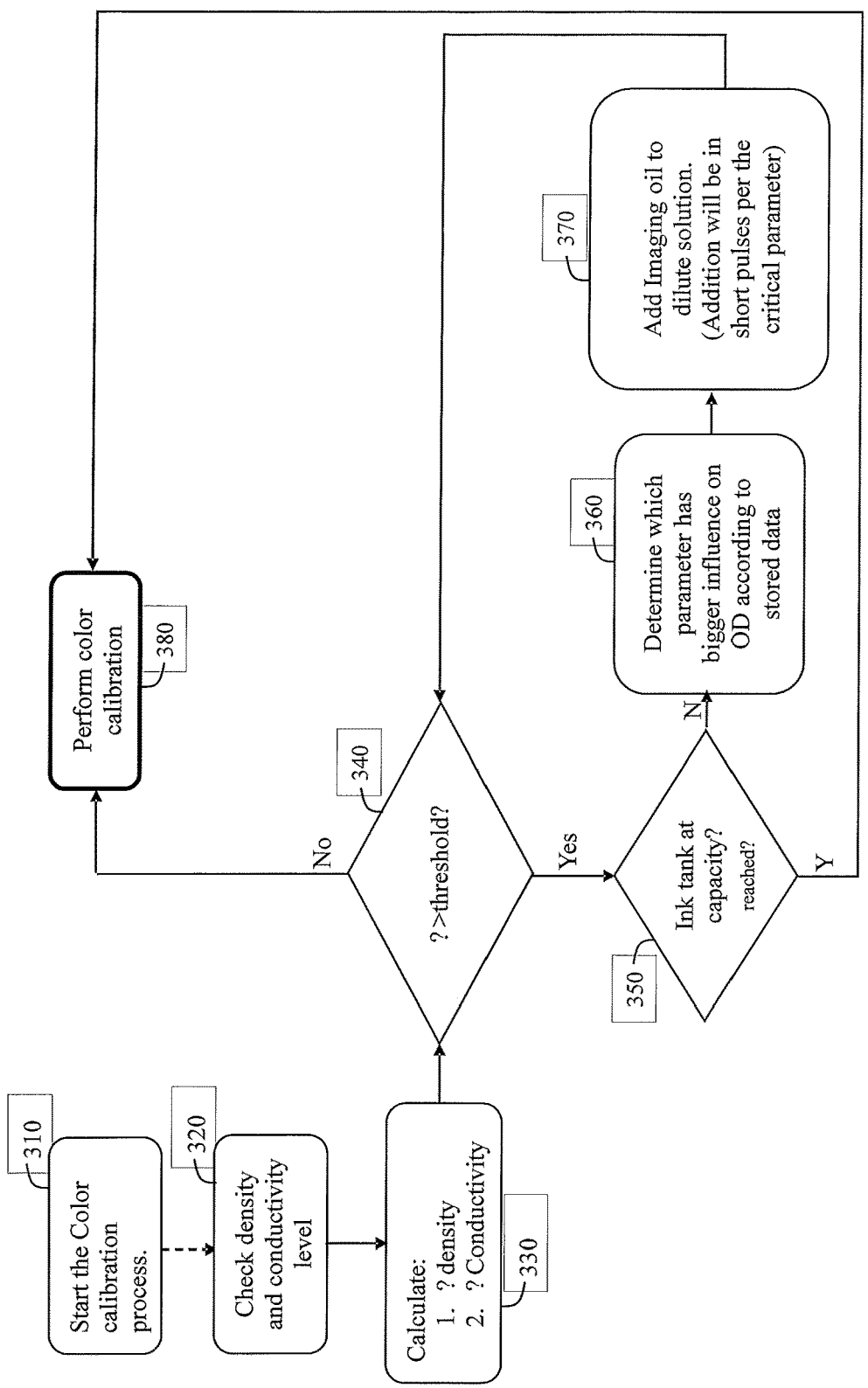
FIG. 3 is a flow diagram illustrating example operations for color adjustment in the system illustrated in FIG. 1, according to some of the example aspects described herein.

FIG. 3 illustrates an example flow of operations which may be taken by an apparatus for adjusting control parameters of a printing substance as described in the system of FIG. 1. First, an indication that a color calibration should be started may be provided (310). According to some example aspects, such an indication may be provided based on a predetermined frequency, for example, color calibration may be performed after a predetermined period of time or printing iterations.

Once an indication that the color calibration process is to take place is provided, measurements may be obtained of any number of control parameters 320. According to some of the example aspects, the measurements may be provided via any number of sensors 105 within the tanks 106. For example, the method may check density and conductivity level 320. Once measured it can be compared to the pre-defined target value or threshold range of such values of the specific control parameter and corrected if needed.

According to the example provided in FIG. 1, example control parameters to be measured may be a printing substance pigment density and/or a printing substance conductivity. According to some of the example aspects, it has been appreciated that adjustments to the pigment density and conductivity have direct effect on the optical density of the printing substance. Thus, adjustments to the pigment density and/or conductivity, prior to the color calibration process, may provide for a more effective an efficient color calibration process. Specifically, by adjusting the control parameters, the time window 210 discussed in FIG. 2 may be reduced. The pigment density and conductivity are provided herein merely as examples, it should be appreciated that other control parameters may be adjusted according to the example aspects discussed herein.

According to some of the example aspects, the printing substance may comprise color particles within an oil or water based solution. In such instances, the printing substance pigment density is the ratio of the color particles to the oil or water based solution, whereas the greater the number of color particles, the greater the resulting optical density (OD) of the printing substance on the printing target will be.

According to some of the example aspects, the printing substance conductivity may be the ratio of conductive particles, which provide the electrostatic charge, to the oil or water based solution. The greater the number of conductive particles, the lower the resulting optical density (OD) of the printing substance on the printing target will be.

Once the measurements of the control parameters are obtained, the measured values are compared to predetermined threshold values of the control parameters which will which represent an allowable deviation from the operational set point of the control parameters (330). According to some of the example aspects, such threshold values may be pre-calculated and stored, for example, within a database or table. Upon comparing the measured values a determination may be made as to whether the measured values deviate within an acceptable range from a predetermined threshold range (340).

If it is determined that the measured values exceed the predetermined threshold range of values, adjustments of the control parameters are made. In adjusting the control parameters, first a determination is made as to whether the printing substance tank is at capacity (350). In adjusting the control parameters of the printing substance, additions may be made to the substance itself. Thus, if the tank is at full capacity, such additions may not be made. In this instance, no adjustments are made and color calibration is performed (380). In determining if the tank is at full capacity, any form of weight, level or any other sensor suitable for such a determination may be used.

If it is determined that the tank is not at full capacity, adjustments to the printing substance may be made. According to some of the example aspects, a determination may be made as to which of the measured control parameters has a bigger influence on the resulting optical density (360). Such a determination may be made based on the stored database or table correlating threshold range values of the control parameters with the intended optical density on the printing target. According to some of the example aspects, any number of control parameters may be adjusted.

Finally, adjustments may be made to the control parameters (370). According to some of the example aspects, the printing substance pigment density is to be adjusted. In such instances, a diluting agent may be added to the printing substance to decrease the pigment density. According to some of the example aspects, the diluting agent may be water or oil. According to some of the example aspects, color particles may be added to the printing substance in order to increase the pigment density of the printing substance. The addition of the color or diluting agent may be performed within the tank via the capsule.

According to some of the example aspects, the printing substance conductivity may be adjusted. In such instances, a diluting agent may be added to the printing substance to decrease the conductivity of the printing substance. According to some of the example aspects, the diluting agent may be oil or water based. According to some example aspects, conductivity particles may be added to the printing substance to increase the conductivity of the printing substance. The addition of the conductivity particles or diluting agent may be performed within the tank via the capsule.

Once the adjustments to the control particles have been made (370), a further evaluation may be made with respect to the updated measurement values of the control parameters and the predetermined threshold range (340). If further adjustments are needed operations 350-370 may be repeated. If it is determined that the updated or current measurement values of the control parameters are within the predetermined threshold range of values, the color calibration process may begin (380).

Figure 4:
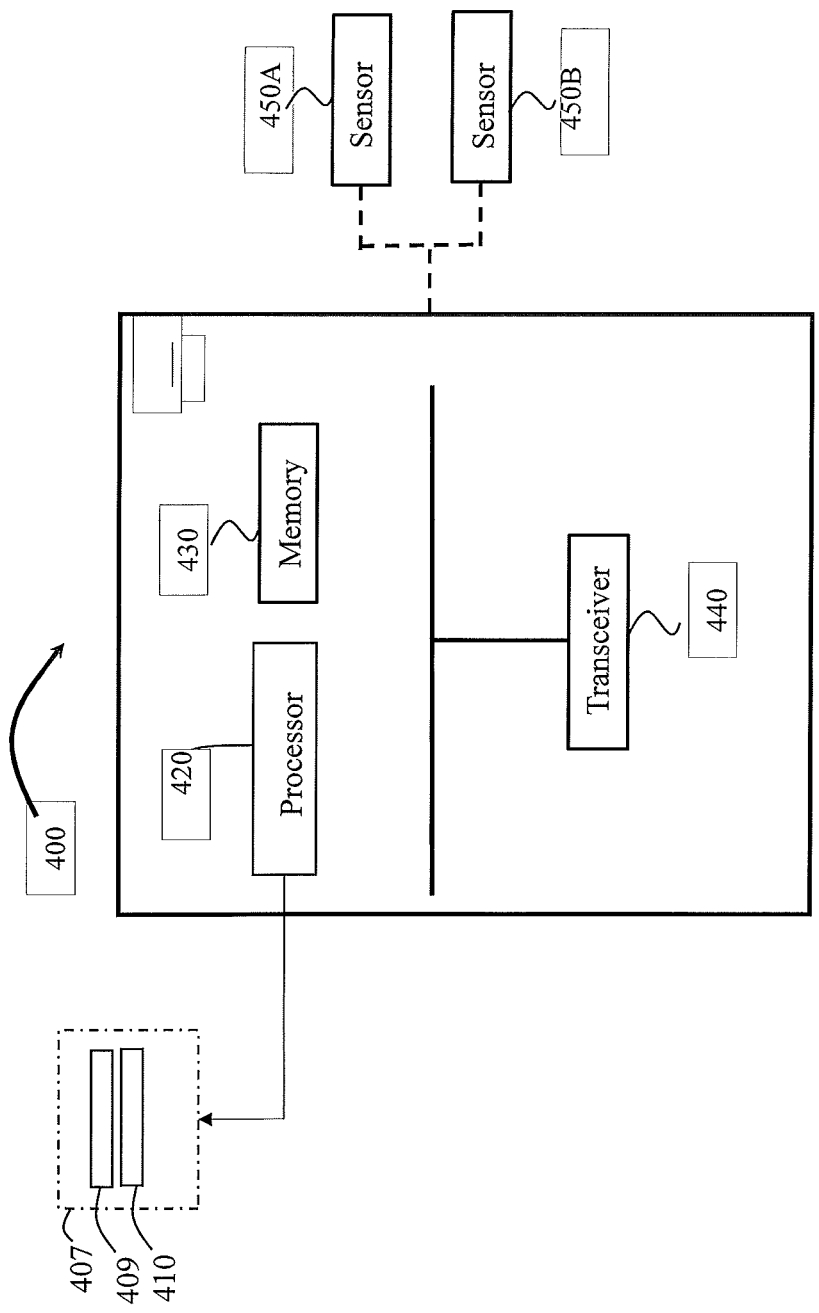
FIG. 4 is an example hardware configuration of an apparatus for performing adjustments to control parameters of a printing substance, according to some of the example aspects described herein.

FIG. 4 illustrates an example hardware configuration of the apparatus 400 used for adjusting control parameters as described herein. The apparatus 400 may comprise any number of network interfaces or transceivers 440 which may be configured to receive and transmit any form of adjustment, measurement or sensing related information and/or instructions. According to some aspects, the network interface may also comprise of individual transmitting and/or receiving interfaces or any number of receiving and/or transmitting interfaces. According to some aspects, the transceiver(s) may be configured to receive measurement data from any number of sensors 450A and 450B which may be comprised in a printing substance tank or capsule or elsewhere within the printing system.

The apparatus 400 may further comprise at least one memory 430 that may be in communication with the network interfaces or transceiver(s). The memory 430 may store received or transmitted data and/or executable program instructions. The memory may also store information relating to the adjustment of control parameters or threshold information as described herein. The memory may be any suitable type of machine readable medium and may be of a volatile and/or non-volatile type.

The apparatus 400 may also comprise at least one processor 420 which may be configured to process received information related to the control parameter adjustments, measurements of control parameters and threshold values of the printing substance as described herein. Specifically, the processor may be utilized in providing the comparison 407 of the measured values 409, for example provided by sensors 450A and 450B, with the associated predetermined threshold range of the control parameter 410. If the measured control parameter is outside of the predetermined threshold range, the processor may adjust the control parameter. Adjustments may be made with the use of capsule 101, as illustrated in FIG. 1. According to some of the example aspects, the processor may receive instructions on the providing of any such comparisons or adjustments. The processor may be any suitable computation logic, for example, a microprocessor, digital signal processor (DSP), field programmable gate array (FPGA), or application specific integrated circuitry (ASIC) or any other form of circuitry.

Figure 5:
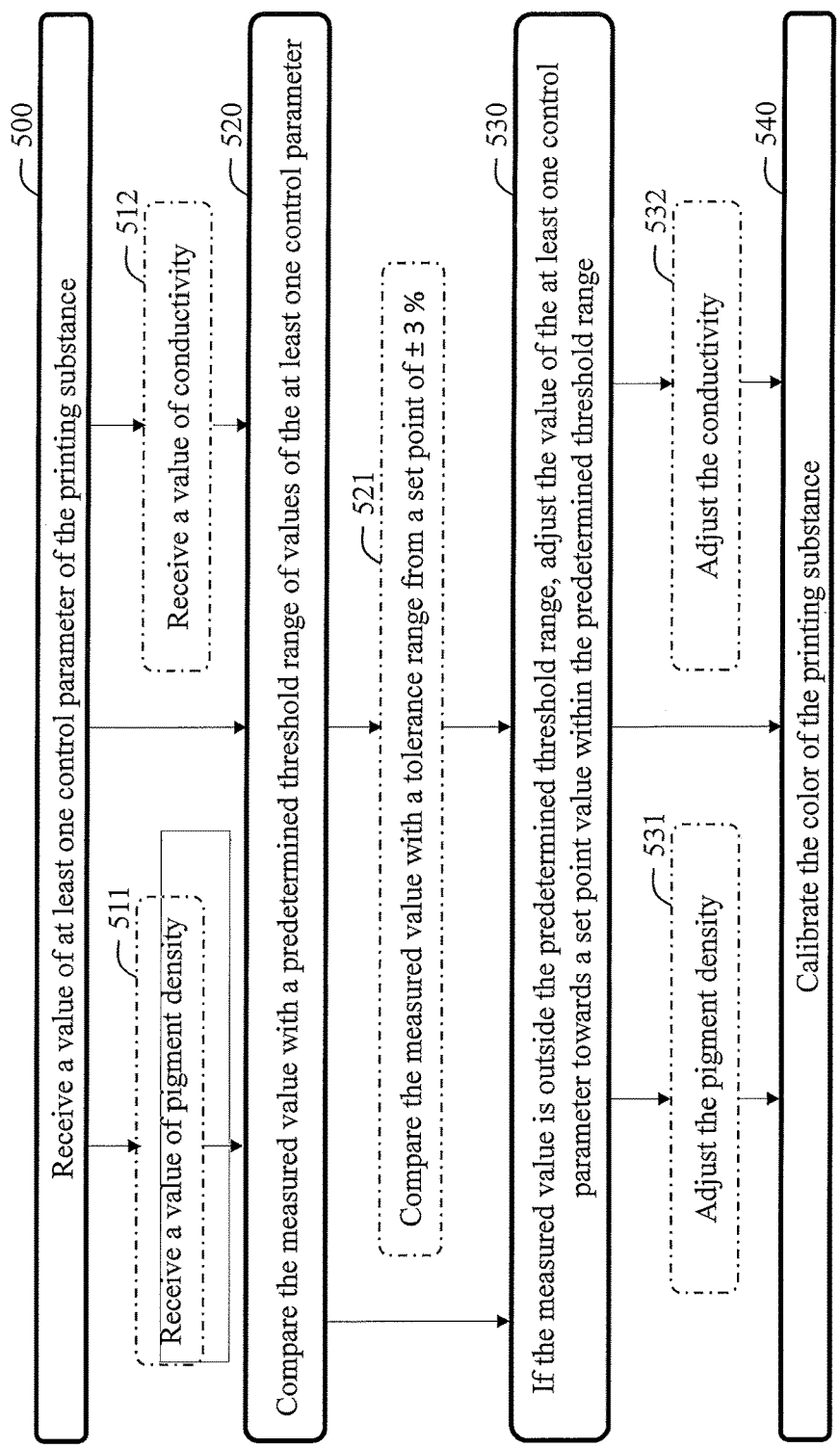
FIG. 5 is a flow diagram of example operations which may be taken by the apparatus of FIG. 4, according to some of the example aspects described herein.

FIG. 5 illustrates a flow diagram depicting example operations which may be taken by the apparatus 400 as described herein. It should be appreciated that FIG. 5 comprises some operations which are illustrated in a solid border and some operations which are illustrated with a dashed boarder. The operations which are comprised in a solid border are operations which are comprised in the broadest aspect. The operations which are comprised in a dashed boarder are example aspects which may be comprised in, or a part of, or are further operations which may be taken in addition to the operations of the broader example aspects. It should be appreciated that these operations need not be performed in order. Furthermore, it should be appreciated that not all the operations need to be performed. The example operations may be performed in any order and in any combination.

Operation 500

The apparatus 400 is configured to receive 500 a value of at least one control parameter of the printing substance. The transceiver 440 is configured to receive the value of the at least one control parameter of the printing substance.

According to some example aspects, the value of the at least one control parameter may be obtained from a sensor within the printing substance tank. Such measurements may take place in a periodic fashion or when an indication that a color calibration is needed is present.

Example Operation 511

According to some example aspects, the receiving 500 may further comprise receiving 511 a value of the pigment density of the printing substance. The transceiver 440 may be configured to receive the value of the pigment density of the printing substance. According to such example aspects, the control parameter may comprise the pigment density of the printing substance as described in relation to FIG. 3.

Example Operation 512

According to some of example aspects, the receiving 500 may further comprise receiving 512 a value of the conductivity of the printing substance. The transceiver 440 may be configured to receive the value of the conductivity of the printing substance. According to such example aspects, the control parameter may comprise the conductivity of the printing substance as described in relation to FIG. 3.

Operation 520

The apparatus is further configured to compare 520 the measured value with a predetermined threshold range of values of the at least one control parameter. The predetermined threshold range is associated an allowable deviance from an operational set point of the printing substance. The processor 420 is configured to compare the measured value with the predetermined threshold range of values of the at least one control parameter.

Such an example aspect is described in at least operations 330 and 340 of FIG. 3. Specifically, the apparatus may evaluate the measured control parameter values and determine if adjustments to the control parameters are needed in order to be within the predetermined threshold value of the printing substance on the printing target.

Example Operation 521

According to some of the example aspects, the comparing 520 may further comprise comparing 521 the measured value with the predetermined threshold range featuring a tolerance range from a set point of ±3% from an operational set point value. The processor 420 may be configured to compare the measured value with the tolerance range from the set point of ±3%.

As described in relation to FIG. 3, operation 340, the measured value is evaluated with respect to have far the value deviates from an operating set point. If the measured value deviates beyond an acceptable threshold range, an adjustment of the control parameter in question may be needed.

Operation 530

If the measured value is outside the predetermined threshold range, the apparatus is further to adjust 530 the value of the at least one control parameter towards a set point value within the predetermined threshold range. The processor 420 is to adjust the value of the at least one control parameter towards a set point value within the predetermined threshold range.

Such an adjustment is further described in at least operations 350-370 of FIG. 3. In the example provided by FIG. 3, a pigment density and/or a conductivity of the printing substance may be adjusted based on the comparison of the measured value of the control parameter and an associated value of the control parameter which is known to yield the intended optical density for the printing substance on the printing target.

Example Operation 531

According to some example aspects, the adjusting 530 may further comprise adjusting 531 the pigment density of the printing substance. The processor 420 may adjust the pigment density of the printing substance.

According to some of the example aspects, the adjusting of the pigment density may comprise adding color particles to the printing substance to increase the pigment density. The processor 420 may add the color particles to the printing substance to increase the pigment density.

According to some of the example aspects, the adjusting of the pigment density may comprise adding a diluting agent to the printing substance to decrease the pigment density. The processor 420 may add the diluting agent to the printing substance to decrease the pigment density. According to some example aspects, the diluting agent may be water or oil based.

Such an adjustment is further described in at least operations 350-370 of FIG. 3. In the example provided by FIG. 3, a pigment density of the printing substance may be adjusted based on the comparison of the measured value of the control parameter and the predetermined threshold range of values for the printing substance on the printing target.

Example Operation 532

According to some of the example aspects, the adjusting 530 may further comprise adjusting 532 the conductivity of the printing substance. The processor 420 may adjust the conductivity of the printing substance.

According to some of the example aspects, the adjusting of the conductivity may comprise adding conductivity particles to the printing substance to increase the conductivity. The processor 420 may add the conductivity particles to the printing substance to increase the conductivity.

According to some of the example aspects, the adjusting of the conductivity may comprise adding a diluting agent to the printing substance to decrease the conductivity. The processor 420 may add the diluting agent to the printing substance to decrease the conductivity. According to some of the example aspects, the diluting agent may be oil or water based.

Such an adjustment is further described in at least operations 350-370 of FIG. 3. In the example provided by FIG. 3, a conductivity of the printing substance may be adjusted based on the comparison of the measured value of the control parameter and the predetermined threshold range of values for the printing substance on the printing target.

Operation 540

The apparatus is further configured to calibrate the color of the printing substance. The processor 420 is configured to calibrate the color of the printing substance. As explained in conjunction with FIG. 2, the adjustments to the color parameters are made prior to the color calibration, therefore the window of adjustments 210 is reduced and the control parameters are closer to an operational set point 230.

Throughout the description and claims of this specification, the words "comprise" and "contain" and variations of them mean "including but not limited to", and they are not intended to (and do not) exclude other moieties, additives, components or integers. Throughout the description and claims of this specification, the singular encompasses the plural unless the context otherwise states. In particular, where the indefinite article is used, the specification is to be understood as contemplating plurality as well as singularity, unless the context states otherwise.

Features, integers, characteristics, compounds, chemical moieties or groups described in conjunction with a particular aspect or example of the aspects described herein are to be understood to be applicable to any other aspect or example described herein unless incompatible therewith. All of the features disclosed in this specification (including any accompanying claims, abstract and drawings), and/or all of the operations of any method or process so disclosed, may be combined in any combination, except combinations where at least some of such features and/or operations are mutually exclusive. The example aspects are not restricted to the details of any foregoing aspects. The example aspects extend to any novel one, or any novel combination, of the features disclosed in this specification (including any accompanying claims, abstract and drawings), or to any novel one, or any novel combination, of the operations of any method or process so disclosed.

The invention claimed is:

1. An apparatus for adjusting control parameters of a printing substance for a printing system in before a color calibration process, the apparatus comprising: at least one sensor in a tank for the printing substance, the tank connected to supply the printing substance for printing by the printing system;
   a transceiver to receive a measurement of a value of at least one control parameter from the least one sensor; and
   a processor to:
      compare the measured value with a predetermined threshold range of values of the at least one control parameter, wherein the predetermined threshold range is associated with an allowable deviance from an operational set point of the printing substance;
      adjust the value of the at least one control parameter towards the set point value within the predetermined threshold range if the measured value is outside the predetermined threshold range; and
   thereafter calibrate the color of the printing substance.

2. The apparatus of claim 1, wherein the at least one control parameter includes a pigment density of the printing substance and the processor is to adjust the value of the at least one control parameter via the processor to:
   add a diluting agent to the printing substance to decrease the pigment density of the printing substance; or
   add color particles to the printing substance to increase the pigment density of the printing substance.

3. The apparatus of claim 2, wherein the diluting agent comprises water or oil.

4. The apparatus of claim 1, wherein the at least one control parameter includes a conductivity of the printing substance and wherein the processor is to adjust the at least one control parameter via the processor to:
   add a diluting agent to the printing substance to decrease the conductivity of the printing substance; or
   add conductivity particles to the printing substance to increase the conductivity of the printing substance.

5. The apparatus of claim 4, wherein the diluting agent comprises water or oil.

6. The apparatus of claim 1, wherein the predetermined threshold range is a tolerance range from the set point of ±3%.

7. The apparatus of claim 1, wherein the processor is to adjust the at least one control parameter via the processor by adding conductivity particles to the printing substance to increase the conductivity of the printing substance.

8. The apparatus of claim 1, wherein the processor is to adjust the at least one control parameter via the processor by adding a diluting agent to the printing substance to decrease the conductivity of the printing substance.

9. A printing system comprising an apparatus for adjusting control parameters of a printing substance for a printing system before a color calibration process, the apparatus comprising:
   a receiver to receive a measurement of a value of at least one control parameter from at least one sensor; and
   a processor to:
      compare the measured value with a predetermined threshold range of values of the at least one control parameter, wherein the predetermined threshold range is an allowable deviance from an operational set point of the printing substance;
      adjust the value of the at least one control parameter towards the set point value within the predetermined threshold range if the measured value is outside the predetermined threshold range; and thereafter calibrate the color of the printing substance.

10. The printing system of claim 9, wherein the at least one control parameter includes a pigment density of the printing substance and wherein the processor of the apparatus is to adjust the value of the at least one control parameter via the processor to:

add a diluting agent to the printing substance to decrease the pigment density of the printing substance; or add color particles to the printing substance to increase the pigment density of the printing substance.

11. The printing system of claim 10, wherein the diluting agent comprises water or oil.

12. The printing system of claim 9, wherein the at least one control parameter includes a conductivity of the printing substance and wherein the processor of the apparatus is to adjust the at least one control parameter via the processor to:

add a diluting agent to the printing substance to decrease the conductivity of the printing substance; or add conductivity particles to the printing substance to increase the conductivity of the printing substance.

13. The printing system of claim 12, wherein the diluting agent comprises water or oil.

14. A non-transitory computer readable medium having executable instructions stored thereon which, when executed by an apparatus for adjusting control parameters of a printing substance for a printing system before a color calibration process, cause the apparatus to:

receive a value of at least one control parameter of the printing substance;

compare the measured value with a predetermined threshold range of values of the at least one control parameter, wherein the predetermined threshold range is an allowable deviance from an operational set point of the printing substance on a printing target;

if the measured value is outside the predetermined threshold range, adjust the value of the at least one control parameter towards a set point value within the predetermined threshold range; and thereafter calibrating the color of the printing substance;

wherein adjusting the value of the at least one control parameter comprises determining an additive to add to the printing substance in a printing substance tank based on which measured control parameter has a larger influence on optical density of the printing substance when printed.

15. The computer readable medium of claim 14, wherein the at least one control parameter includes a pigment density of the printing substance, wherein the instructions to adjust the value of the at least one control parameter further cause the apparatus to:

add a diluting agent to the printing substance and thereby decreasing the pigment density; or add color particles to the printing substance and thereby increasing the pigment density.

16. The computer readable medium of claim 14, wherein the at least one control parameter includes conductivity of the printing substance, wherein the instructions to adjust the value of the at least one control parameter further cause the apparatus to:

add a diluting agent to the printing substance thereby decreasing the conductivity of the printing substance; or add conductivity particles to the printing substance thereby increasing the conductivity of the printing substance.

17. The computer readable medium of claim 14, wherein the predetermined threshold range is a tolerance range from the set point of ±3%.

18. The computer readable medium of claim 14, wherein the instructions further cause the apparatus to:

receive a value of pigment density and conductivity as two control parameters; and determine which has a larger influence on optical density of the printing substance before determining the additive to add to the printing substance in the tank.

19. The computer readable medium of claim 18, wherein the instruction further cause the apparatus to access a table of data to determine whether pigment density or conductivity will have a larger influence on the optical density of the printing substance.

20. The computer readable medium of claim 14, wherein the instructions further cause the apparatus to determine if a tank containing the printing substance is at capacity before determining an additive to add to the printing substance.

* * * * *